United States Patent
Zhang et al.

(10) Patent No.: US 11,364,766 B2
(45) Date of Patent: Jun. 21, 2022

(54) DUCT ASSEMBLY FOR A VEHICLE HVAC SYSTEM

(71) Applicant: Ford Global Technologies, LLC, Dearborn, MI (US)

(72) Inventors: Yahong Zhang, Canton, MI (US); Eric J. Hupfel, Harrison Township, MI (US); Elisangela Po Previte, Wolverine Lake, MI (US); Craig Wetzel, Dearborn, MI (US); Ian McLaughlin, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 16/427,752

(22) Filed: May 31, 2019

(65) Prior Publication Data
US 2020/0376925 A1    Dec. 3, 2020

(51) Int. Cl.
*B60H 1/00* (2006.01)
*B60H 1/24* (2006.01)

(52) U.S. Cl.
CPC ......... *B60H 1/00564* (2013.01); *B60H 1/242* (2013.01); *B60H 1/247* (2013.01)

(58) Field of Classification Search
CPC ........ B60H 2001/00214; B60H 1/0066; B60H 2001/00721; B60H 2001/00192; B60H 2001/00092; B60H 2001/00185; B60H 1/26; B60H 1/00564; B60H 1/3414; B60H 1/242; B60H 1/247; F24F 13/12; F16K 31/02

USPC ......................................................... 454/162
See application file for complete search history.

(56) References Cited

U.S. PATENT DOCUMENTS

| | | | | |
|---|---|---|---|---|
| 3,360,005 A | * | 12/1967 | Sopher | F02M 35/1222 137/512.1 |
| 4,394,958 A | * | 7/1983 | Whitney | F24F 13/1426 236/49.3 |
| 4,452,391 A | * | 6/1984 | Chow | F24F 13/1426 236/49.3 |
| 5,199,461 A | * | 4/1993 | Carr | B60H 1/00678 137/625.44 |
| 5,368,072 A | * | 11/1994 | Cote | F16K 11/0655 137/872 |

(Continued)

FOREIGN PATENT DOCUMENTS

CN   205588938 U   9/2016
FR   2773110 A1 * 7/1999   ......... B60H 1/00692

(Continued)

*Primary Examiner* — Michael G Hoang
*Assistant Examiner* — Andrew W Cheung
(74) *Attorney, Agent, or Firm* — Vichit Chea; Price Heneveld LLP

(57) ABSTRACT

A vehicle dashboard includes a trim panel defining an airflow opening. At least one register duct defines a register opening. The at least one register duct is disposed adjacent to the trim panel and the register opening aligns with the airflow opening. At least one demister duct defines a demister opening. The at least one demister duct is disposed adjacent to the trim panel and the demister opening aligns with the airflow opening. A first air deflector slidably engaged with the at least one register duct. A second air deflector slidably engaged with the at least one register duct.

18 Claims, 8 Drawing Sheets

(56) References Cited

U.S. PATENT DOCUMENTS

| | | | | |
|---|---|---|---|---|
| 6,237,630 | B1* | 5/2001 | Stone | F16K 17/383 |
| | | | | 137/601.12 |
| 6,347,987 | B1* | 2/2002 | Ichishi | B60H 1/247 |
| | | | | 454/153 |
| 6,394,891 | B1* | 5/2002 | Arold | B60H 1/3414 |
| | | | | 454/155 |
| 6,676,508 | B1* | 1/2004 | Graham | F24F 13/1426 |
| | | | | 454/270 |
| 9,950,592 | B2 | 4/2018 | Zhang | |
| 10,144,269 | B2 | 12/2018 | Zhang et al. | |
| 10,240,829 | B2* | 3/2019 | Richardson | F16K 31/0644 |
| 2003/0157877 | A1* | 8/2003 | Butera | B60H 1/00028 |
| | | | | 454/121 |
| 2006/0081292 | A1* | 4/2006 | Sarno | F16K 15/033 |
| | | | | 137/527 |
| 2009/0286462 | A1* | 11/2009 | Goto | B60H 1/3428 |
| | | | | 454/155 |
| 2010/0124876 | A1* | 5/2010 | Yu | F24F 13/06 |
| | | | | 454/155 |
| 2010/0261422 | A1* | 10/2010 | Sakakibara | B60H 1/3414 |
| | | | | 454/155 |
| 2014/0030976 | A1* | 1/2014 | Spalding | F24F 13/06 |
| | | | | 454/347 |
| 2015/0253781 | A1* | 9/2015 | Ashton | F24F 11/75 |
| | | | | 454/256 |
| 2017/0120721 | A1* | 5/2017 | Zhang | B60H 1/0065 |
| 2017/0253107 | A1 | 9/2017 | Castiglioni et al. | |
| 2018/0162199 | A1 | 6/2018 | Stoia et al. | |

FOREIGN PATENT DOCUMENTS

| | | |
|---|---|---|
| FR | 2845948 B1 | 4/2004 |
| JP | 2005271777 A | 10/2005 |

* cited by examiner

DUCT ASSEMBLY FOR A VEHICLE HVAC SYSTEM

FIELD OF THE DISCLOSURE

The present invention generally relates to ductwork for a heating, ventilation, and air conditioning (HVAC) system of a vehicle, and more specifically, register and demister ducts for directing air into a passenger cabin.

BACKGROUND OF THE DISCLOSURE

Conventional automobiles include ductwork that extends through various portions of the vehicle, including within a dashboard and behind an instrument panel of the vehicle. Also within the dashboard are numerous components that are positioned alongside the various ductwork of the vehicle HVAC system. Such components can include an automotive heads up display (AHUD), various instrument modules, steering systems, and other similar systems that are at least partially positioned within the dashboard of the vehicle.

SUMMARY OF THE DISCLOSURE

According to at least one aspect of the present disclosure, a vehicle dashboard includes a trim panel defining an airflow opening. At least one register duct defines a register opening. The at least one register duct is disposed adjacent to the trim panel and the register opening aligns with the airflow opening. At least one demister duct defines a demister opening. The at least one demister duct is disposed adjacent to the trim panel and the demister opening aligns with the airflow opening. A first air deflector is slidably engaged with the at least one register duct. A second air deflector is slidably engaged with the at least one register duct.

According to another aspect of the present disclosure, a duct assembly for a vehicle HVAC system includes a trim panel defining an airflow opening. At least one register duct is disposed adjacent to the trim panel. The at least one register duct defines a register opening aligned with the airflow opening. At least one demister duct is disposed adjacent to the trim panel. The at least one demister duct defines a demister opening aligned with the airflow opening. At least one register shutter is operably coupled to the register duct. The at least one register shutter is operable between an opened position and a closed position. At least one demister shutter is operably coupled to the demister duct. The at least one demister shutter is operable between an opened position and a closed position.

According to another aspect of the present disclosure, a duct assembly for a vehicle HVAC system includes a trim panel defining an elongated airflow opening. The elongated airflow opening extends between a first end and a second end of the trim panel. A register duct is disposed adjacent to the trim panel and defines a register opening. The register opening is disposed adjacent to the elongated airflow opening. A demister duct is disposed adjacent to the trim panel and defines a demister opening. The demister opening is disposed adjacent to the elongated airflow opening.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the disclosure will be set forth in the detailed description which follows and will be apparent to those skilled in the art from the description, or recognized by practicing the disclosure as described in the following description, together with the claims and appended drawings.

Figure 1:
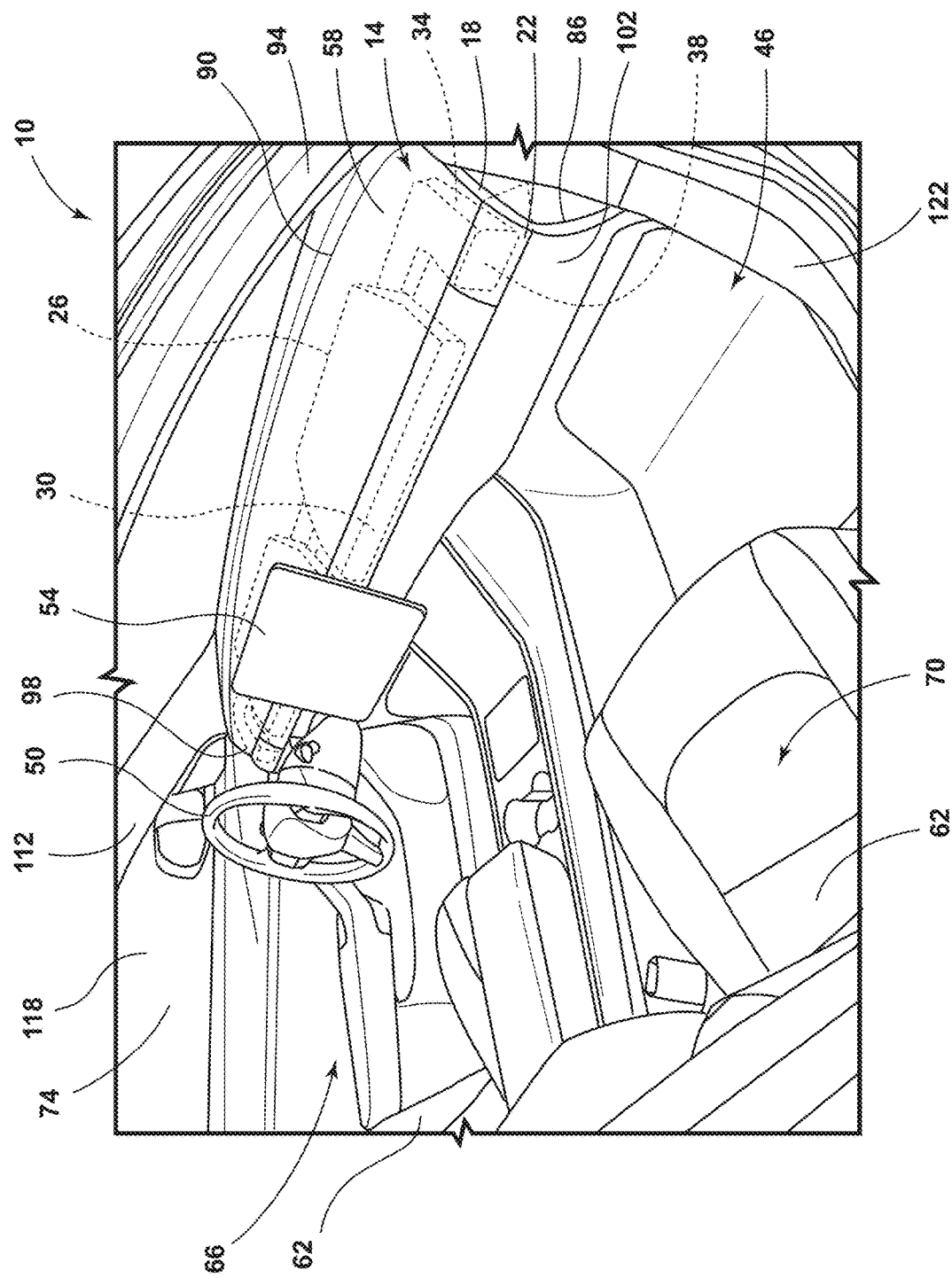
FIG. 1 is a partial side perspective view of a passenger cabin of a vehicle, according to one example.

For purposes of description herein, the terms "upper," "lower," "right," "left," "rear," "front," "vertical," "horizontal," and derivatives thereof shall relate to the concepts as oriented in FIG. 1. In this document, relational terms, such as first and second, top and bottom, and the like, are used solely to distinguish one entity or action from another entity or action, without necessarily requiring or implying any actual such relationship or order between such entities or actions. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8E, a reference numeral 10 generally refers to a vehicle having a dashboard 14. The vehicle dashboard 14 includes a trim panel 18 defining an airflow opening 22. A register duct 26 defines a register opening 30. The register duct 26 is disposed adjacent to the trim panel 18. The register opening 30 aligns with the airflow opening 22. A demister duct 34 defines a demister opening 38. The demister duct 34 is disposed adjacent to the trim panel 18. The demister opening 38 aligns with the airflow opening 22. Air deflectors 42 are slidably engaged with the register duct 26.

Referring to FIG. 1, the vehicle 10 includes the dashboard 14 disposed in a vehicle-forward portion 46 of the vehicle 10. The dashboard 14 may include a steering wheel 50, a display screen 54, and various other vehicle components and controls. As illustrated, the dashboard 14 includes the trim panel 18 having an A-surface 58 disposed adjacent to two seating assemblies 62. As used herein, the term "A-surface" 58 refers to a surface of any component within the vehicle 10 that is visible and/or contactable by an occupant of the vehicle 10 when the component is in an assembled state. Additionally, it is contemplated that the trim panel 18 may not be disposed adjacent to seating assemblies 62 in various vehicle-interior seating configurations. As illustrated, the dashboard 14 extends laterally across the vehicle 10 (e.g., in a y-direction). Accordingly, the dashboard 14 extends adjacent to a driver seating area 66 and a front passenger seating area 70 within a passenger cabin 74 of the vehicle 10. It is also contemplated that the trim panel 18 may be disposed elsewhere in the vehicle 10, and may also be oriented in a different direction (e.g., an x-direction or a z-direction). The vehicle 10 may be a sedan, sports utility vehicle, a van, a truck, a crossover, or other style vehicle. The vehicle may be a manually operated vehicle (e.g., with a human driver), a fully autonomous vehicle (e.g., no human driver), or a partially autonomous vehicle (e.g., may be operated with or without a human driver). Additionally, the vehicle 10 may be utilized for personal and/or commercial purposes, such as for ride-providing services (e.g., chauffeuring) and/or ride-sharing services.

Figure 2:
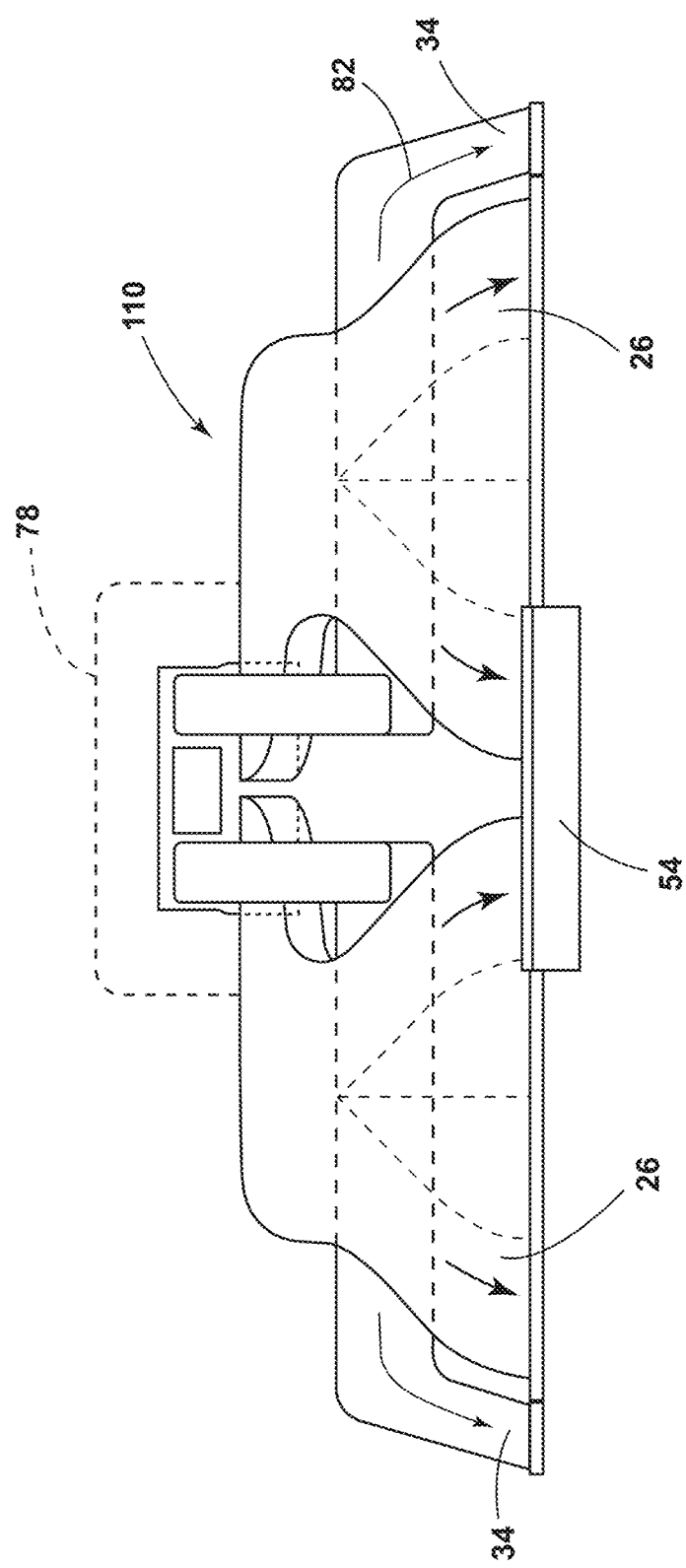
FIG. 2 is a top perspective view of a duct assembly for a vehicle heating, air condition, and ventilation (HVAC) system removed from a vehicle, according to one example.
Figure 3:
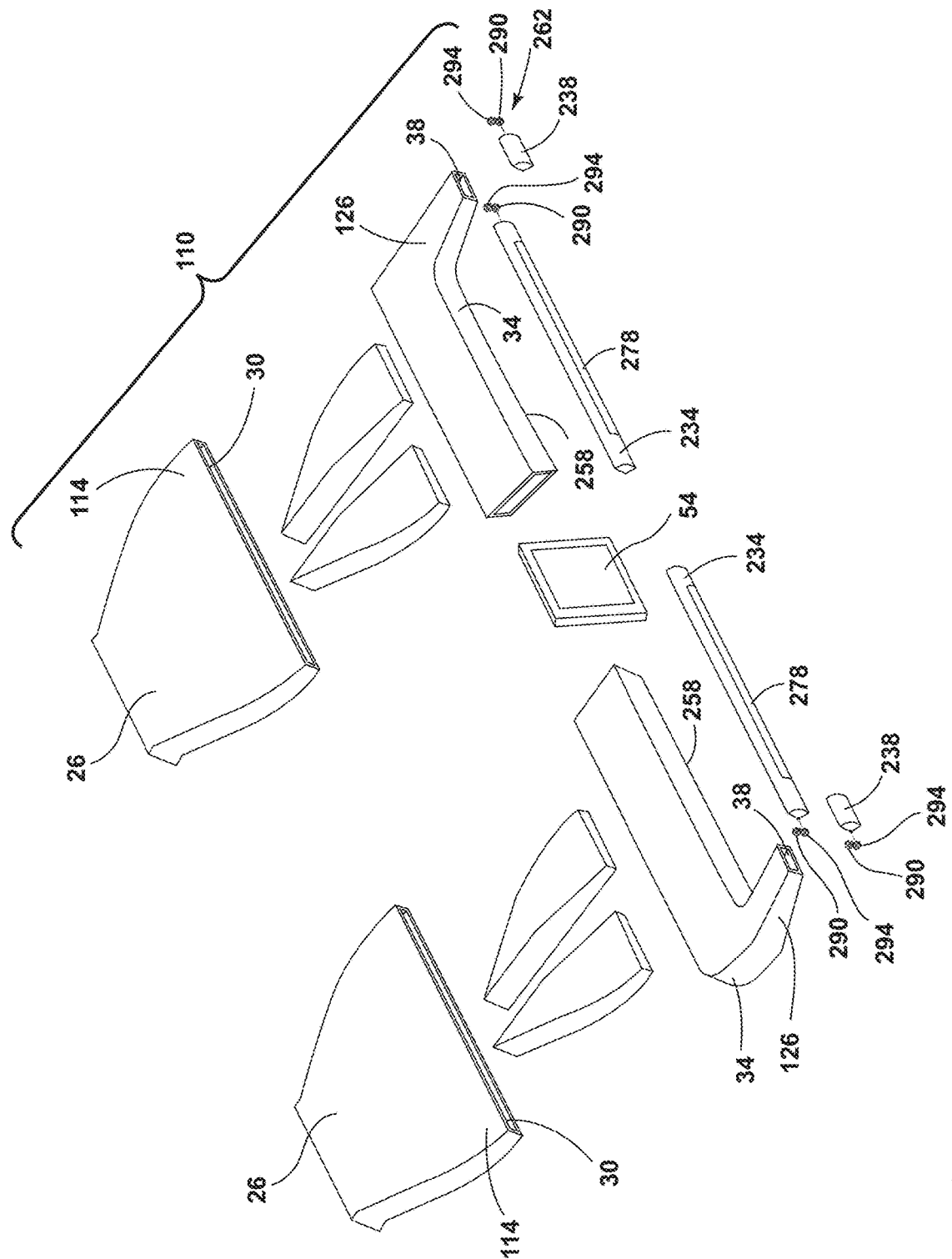
FIG. 3 is a perspective exploded view of the duct assembly of FIG. 2.

Referring to FIGS. 1-3, the vehicle 10 includes a heating, air conditioning, and ventilation (HVAC) system 78 disposed in the vehicle-forward portion 46 of the vehicle 10. HVAC systems 78 typically provide conditioned air 82 to the passenger cabin 74. The HVAC system 78 may clean, cool, heat, regulate, ventilate, and/or dehumidify the air 82 directed into the passenger cabin 74. The HVAC system 78 is disposed adjacent to a B-surface 86 of the trim panel 18 of the dashboard 14 according to one embodiment, such that the HVAC system 78 is substantially obscured from the view of passengers within the passenger cabin 74. As used herein, the term "B-surface" 86 refers to a surface of any component within the vehicle 10 that is concealed and/or non-contactable by an occupant of the vehicle 10 when the component is in an assembled state. The HVAC system 78 may also be disposed in a housing 90 defined by the trim panel 18 of the dashboard 14 and a vehicle body 94. The trim panel 18 defines the airflow opening 22 disposed between a first end 98 of the trim panel 18 and a second end 102 of the trim panel 18. As illustrated in FIG. 1, the airflow opening 22 is an elongated opening extending from the first end 98 to the second end 102 of the trim panel 18. However, it is also contemplated that the airflow opening 22 may extend a portion of the width of the trim panel 18.

Referring to FIGS. 1-3, a duct assembly 110 is operably coupled to the HVAC system 78 of the vehicle 10. The duct assembly 110 includes the register duct 26 and the demister duct 34. As illustrated, the duct assembly 110 includes two register ducts 26 (e.g., a first register duct 26 and a second register duct 26) and two demister ducts 34. It is also contemplated more or fewer ducts may be included in the HVAC system 78 without departing from the teachings herein. Further, it is contemplated that the vehicle 10 may include more or fewer register ducts 26 and/or demister ducts 34. At least one of the register duct 26 and one of the demister ducts 34 may be disposed adjacent to the driver seating area 66 of the vehicle 10. The other register duct 26 and demister duct 34 may be disposed adjacent to the front passenger seating area 70 of the vehicle 10. Accordingly, air 82 from both the register and demister ducts 26, 34 may be supplied to the driver and front passenger seating areas 66, 70 of the vehicle 10.

In various examples, the two register ducts 26 may be disposed adjacent to one another in a side-to-side configuration. The register ducts 26 define the register openings 30 to direct air 82 to the passenger cabin 74. The register openings 30 may be disposed adjacent to and/or align with the airflow opening 22 of the trim panel 18. The register ducts 26 provide air 82 for heating and cooling various portions of the passenger cabin 74 during use. According to various examples, the width of the register ducts 26 increases in a vehicle-forward to vehicle-rearward direction. A vehicle-rearward end 114 of each of the register ducts 26 defines a register opening 30, for allowing the air 82 to flow from the HVAC system 78 to the passenger cabin 74. The increasing width in the vehicle-rearward direction may allow increased quantities and/or intensities of the air 82 to flow into the passenger cabin 74. However, the shape of the register ducts 26 may differ based on the selected airflow patterns and/or configurations. Additionally or alternatively, the register ducts 26 may have planar surfaces, curved surfaces, or other shaped surfaces to direct air 82 into the passenger cabin 74. The shape of the register ducts 26 may alter the airflow pattern of the air 82 entering the passenger cabin 74.

The demister ducts 34 may be disposed adjacent to the register ducts 26 and provide air 82 to side windows 118 adjacent the driver and front passenger seating areas 66, 70 of the passenger cabin 74. The demister ducts 34 may have a substantially Z-shaped cross-sectional shape, allowing the demister ducts 34 to extend from the HVAC system 78 towards lateral sides 122 of the vehicle 10. However, the shape of the demister ducts 34 may differ based on the selected airflow patterns and/or configuration. Further, the demister ducts 34 may have planar surfaces, curved surfaces, or other shaped surfaces to direct air 82 into the passenger cabin 74. Additionally, the demister ducts 34 defines the demister openings 38 for providing air 82 to the passenger cabin 74. The demister openings 38 may align with and/or be disposed adjacent to the airflow opening 22 defined by the trim panel 18. Additionally, the demister openings 38 may be disposed adjacent to the register openings 30.

Referring still to FIGS. 1-3, when assembled into the vehicle 10, the register and demister ducts 26, 34 are disposed adjacent to the B-surface 86 of the trim panel 18. Both the register ducts 26 and the demister ducts 34 are operably coupled to the HVAC system 78. The register ducts 26 extend in a vehicle-rearward direction from the HVAC system 78, and the register openings 30 of the register ducts 26 are disposed adjacent to and/or align with the airflow opening 22 defined by the trim panel 18. Additionally, the demister ducts 34 extend laterally outward in opposing directions from the HVAC system 78 towards the side windows 118 of the vehicle 10. The demister openings 38 are disposed adjacent to and/or align with the airflow opening 22. In other words, both the register openings 30 and the demister openings 38 are aligned with the airflow opening 22. As such, the airflow opening 22 may be an elongated opening to accommodate the register and demister openings 30, 38. Stated differently, the length of the airflow opening 22 may be substantially the same as the combined length of the register and demister openings 30, 38. Additionally or alternatively, the demister ducts 34 may extend below the register ducts 26 to provide for a selected air flow angle towards the side windows 118, as well as to allow for a more compact duct assembly 110. As such, the demister ducts 34 may each include an inclined portion 126. The inclined portion 126 allows the demister openings 38 to align with the airflow opening 22 of the trim panel 18 and be disposed beneath the register ducts 26.

Figure 4:
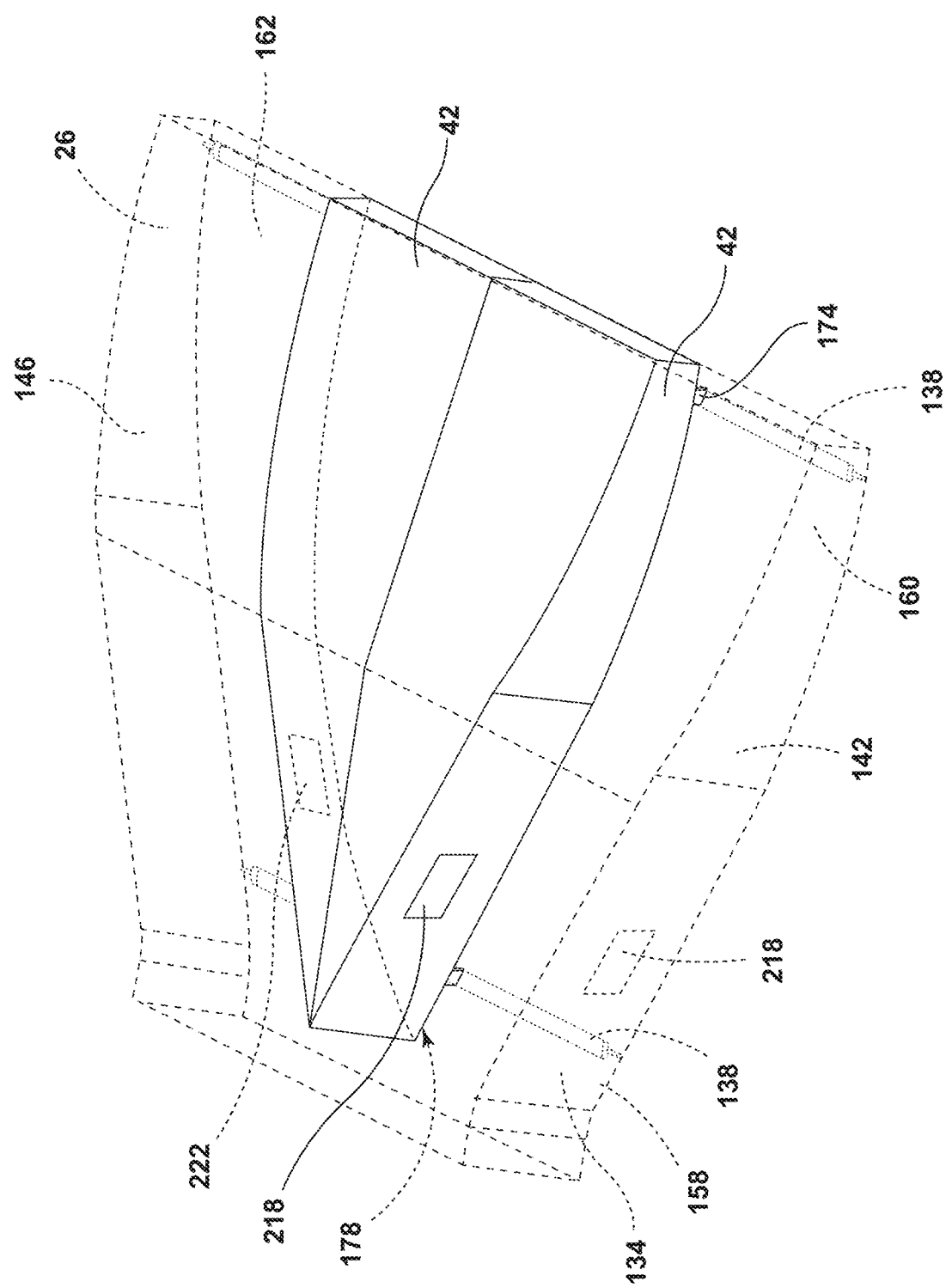
FIG. 4 is a top perspective view of a register duct of a duct assembly for a vehicle HVAC system, according to one example.

Referring to FIG. 4, air deflectors 42 may be operably coupled with the register ducts 26. Two air deflectors 42 (e.g., a first air deflector 42 and a second air deflector 42) may be disposed within a single register duct 26 as illustrated in FIG. 4. The two air deflectors 42 may be mirror images moving in opposite directions within the register ducts 26. However, more or fewer air deflectors 42, or pairs of deflectors 42, may be included. The air deflectors 42 are slidably engaged with an interior surface 134 of the register ducts 26. The interior surfaces 134 of the register ducts 26 define tracks 138 extending laterally between first sides 142 of the register ducts 26 and second sides 146 of the register ducts 26. As illustrated in FIG. 4, each register duct 26 defines two tracks 138 spaced-apart and disposed parallel to one another. The tracks 138 may align with first and second end portions 150, 154 of the air deflectors 42. The tracks 138 are illustrated in vehicle-forward and vehicle-rearward portions 158, 160 of bottom surfaces 162 of the register ducts 26, respectively. However, it is also contemplated that the track 138 positions and/or the configurations of the air deflectors 42 within the register ducts 26 may differ without departing from the teachings herein.

Referring to FIGS. 1 and 4-6, in various examples, the air deflectors 42 are each operable between a retracted position 166 and a deployed position 170. The air deflectors 42 each include a guiding protrusion 174 configured to engage with the tracks 138 defined by the register ducts 26. The guiding protrusions 174 guide the air deflectors 42 along the tracks 138 as the air deflectors 42 move between the retracted and deployed position 166, 170. When in the retracted position 166, the air deflectors 42 are disposed in a center portion 178 of the register ducts 26 in an abutting manner. Stated differently, inner surfaces 182 of the air deflectors 42 abut one another when the air deflectors 42 are in the retracted position 166. Accordingly, the air deflectors 42 block the air 82 from traveling through the center portions 178 of the register ducts 26.

Figure 5:
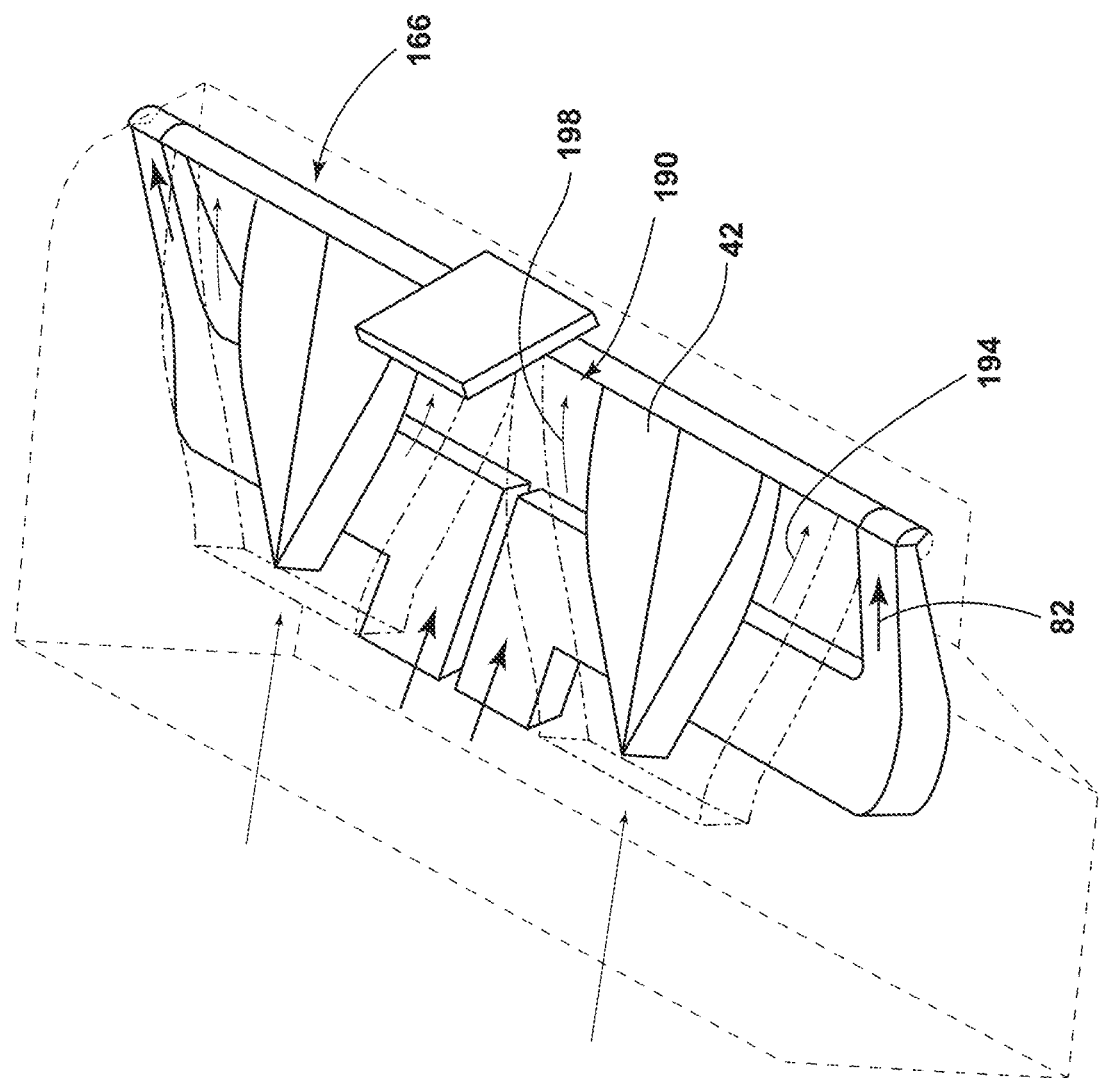
FIG. 5 is a top perspective view of the duct assembly of FIG. 2 showing air deflectors in a retracted position.

When in the retracted position 166, as illustrated in FIG. 5, the air deflectors 42 form a first register branch 186 and a second register branch 190 in each of the register ducts 26. The first and second register branches 186, 190 direct the air 82 in first and second side airflows 194, 198 that extend between outer surfaces 202 of the air deflectors 42 and first and second sides 142, 146 of the register ducts 26. The first and second side airflows 194, 198 may be configured to direct air 82 adjacent to passengers within the seating assemblies 62. For example, when a passenger is disposed in the driver seating area 66, the first and second side airflows 194, 198 may direct air 82 to first and second sides (e.g., left and right) of the driver, respectively. Similar airflow may be provided to a passenger in the front passenger seating area 70. Accordingly, the air 82 traveling through the register ducts 26 may be directed adjacent to passengers in the seating assemblies, but may not blow directly at the passengers.

Figure 6:
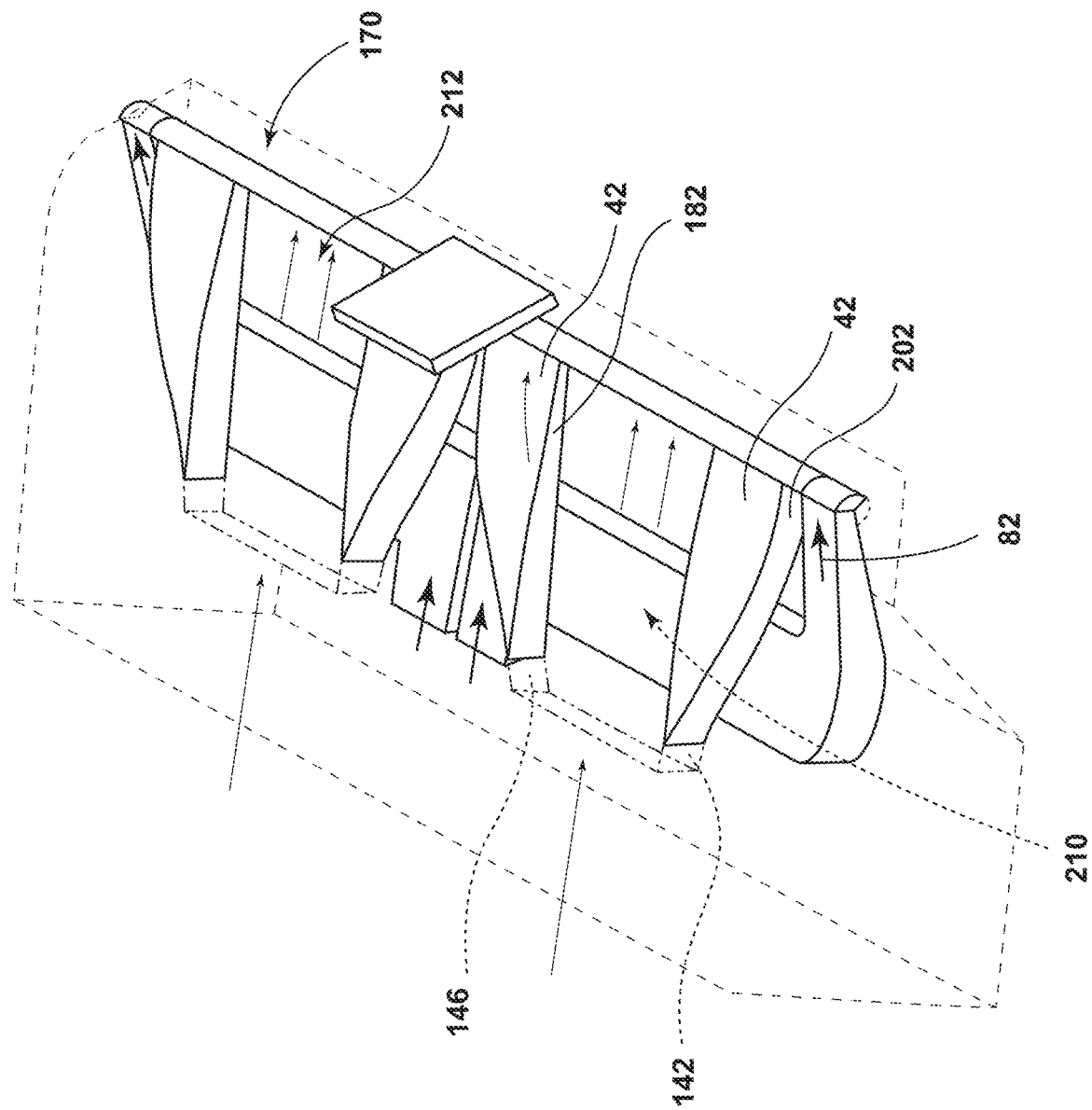
FIG. 6 is a top perspective view of the duct assembly of FIG. 2 showing air deflectors in a deployed position.
Figure 7:
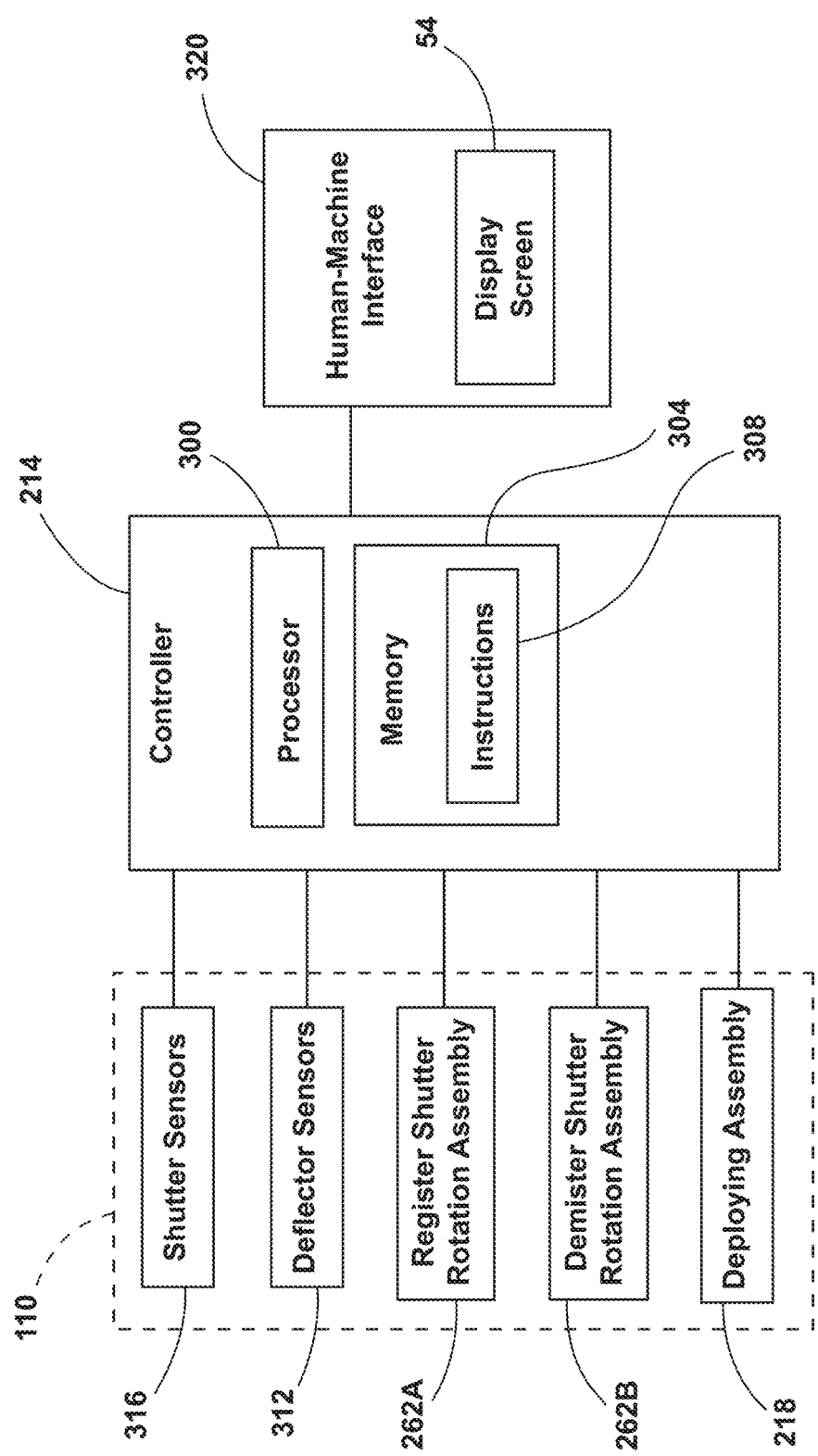
FIG. 7 is a block diagram of a vehicle, according to one example.
Figure 8A:
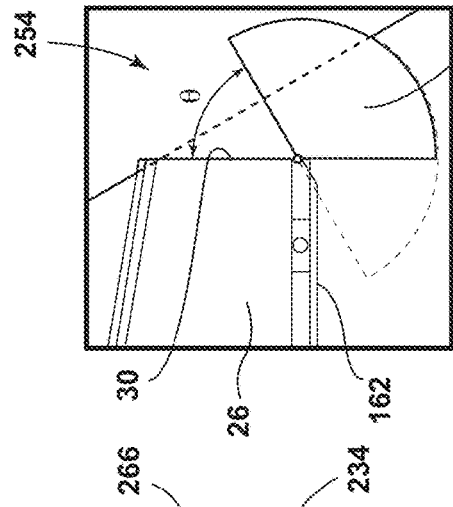
FIG. 8A is a side view of a register shutter for a register duct in a closed position, according to one example.
Figure 8B:
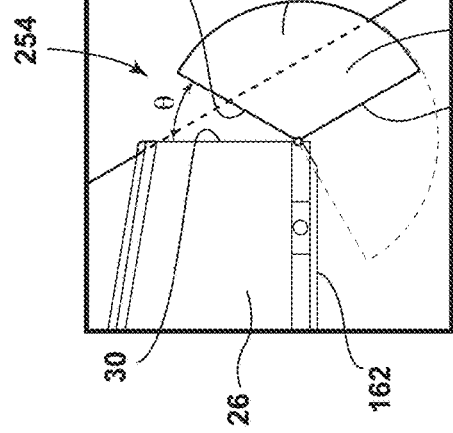
FIG. 8B is a side view of a register shutter for a register duct in an intermediate position, according to one example.
Figure 8C:
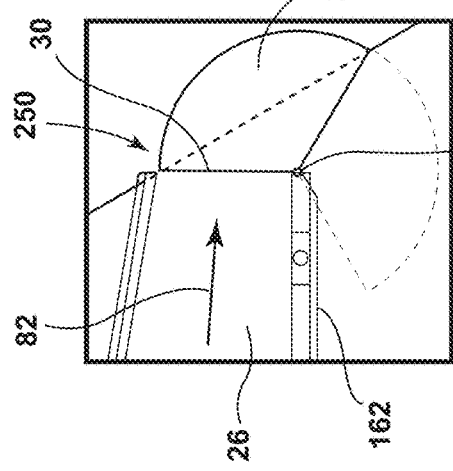
FIG. 8C is a side view of a register shutter for a register duct in an intermediate position, according to one example.
Figure 8D:
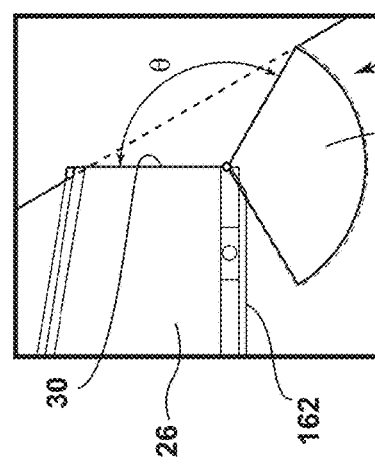
FIG. 8D is a side view of a register shutter for a register duct in an intermediate position, according to one example.
Figure 8E:
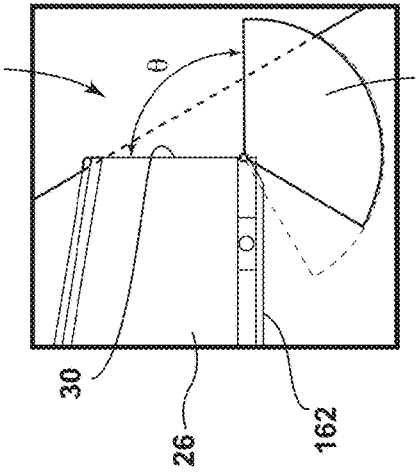
FIG. 8E is a side view of a register shutter for a register duct in an opened position, according to one example.

When in the deployed positions 170, as illustrated in FIG. 6, the air deflectors 42 form a central register branch 210 defined between the inner surfaces 182 of the air deflectors 42. The central register branch 210 may be configured to direct a center airflow 212 directly to passengers within the seating assemblies 62 in the driver seating area 66 and the front passenger seating area 70. Accordingly, the air deflectors 42 may provide for two different airflow configurations for each side of the vehicle 10 (e.g., proximate the driver seating area 66 and the front passenger seating area 70). As illustrated in FIG. 6, when in the deployed positions 170, the outer surfaces 202 of the air deflectors 42 abut and/or are adjacent to the first and second sides 142, 146 of the register ducts 26 between the retracted and deployed positions 166, 170. Accordingly, the air deflectors 42 translate laterally across the register ducts 26. However, it is also contemplated that the air deflectors 42 may move in different directions within the register ducts 26 (e.g., front-to-back, diagonally, etc.). Further, when moving from the retracted position 166 to the deployed positions 170, the air deflectors 42 diverge to separate portions of the register ducts 26, and then converge at the center portion 178 of the register duct 26 when returning to the retracted position 166. It is also contemplated that the air deflectors 42 may move together to one side, or otherwise move independently of one another to form airflow pathways. It is further contemplated that the air deflectors 42 may be disposed adjacent to the first and second sides 142, 146 of the register ducts 26 when in the retracted position 166, and may be disposed in the center portions 178 of the register ducts 26 when in the deployed position 170. It is also contemplated that the register ducts 26 may include splitters for streamlining the airflow directions, which may work in conjunction with, or independently of, the air deflectors 42.

Referring to FIGS. 3-7, the air deflectors 42 may be operably coupled to a controller 214. The controller 214 may be configured to move the air deflectors 42 between the retracted and deployed positions 166, 170. The duct assembly 110 may also include a deploying assembly 218. The deploying assembly 218 may be operably coupled to the controller 214. The controller 214 may activate and deactivate the deploying assembly 218 to move the air deflectors 42 between the retracted and deployed positions 166, 170. In various examples, the air deflectors 42 may be biased to the retracted position 166. Stated differently, when the deploying assembly 218 is in a deactivated state, the air deflectors 42 are in the retracted position 166. In various examples, biasing members 222 may be coupled to the air deflectors 42 to bias the air deflectors 42 towards the retracted position 166. In other words, each of the air deflectors 42 may include a biasing member 222 (e.g., first and second biasing members 222). The deploying assembly 218 may overcome a biasing force of the biasing members 222 when activated and move the air deflectors 42 to the deployed position 170. However, the air deflectors 42 may also be biased towards the deployed position 170.

In the illustrated example, the deploying assembly 218 may include biasing members 222, such as, for example, magnets. The biasing members 222 may be disposed on the inner surfaces 182 of the air deflectors 42, as illustrated in FIG. 3. Further, the biasing members 222 operate to bias the air deflectors 42 towards the retracted position 166. The deploying assembly 218 may also include an actuator 220 disposed on the register duct 26. As illustrated in FIG. 4, the air register 26 may include one actuator 220 disposed on each of the first and second sides 142, 146 of the register duct 26. In a specific example, the actuator 220 may be a universal switch module and actuator or other similar device. The controller 214 may activate the actuator 220, which may cause the air deflectors 42 to slide along the tracks 138 from the retracted position 166 to the deployed position 170. Accordingly, the actuator 220 of the deploying assembly 218 may overcome the biasing force (e.g., a magnetic force) between the biasing members 222 to move the air deflectors 42 to the deployed position 170. The controller 214 may deactivate the deploying assembly 218, and once deactivated, the biasing force may act upon the air deflectors 42 to move the air deflectors 42 back to the retracted position 166. The magnetic-based biasing members 222 disclosed herein are an example, and in no way limit the disclosure. Accordingly, the biasing members 222 may be any biasing members 222 that can bias the air deflectors 42 towards a selected position (e.g., one of the retracted and deployed positions 166, 170). Further, the deploying assembly 218 may be any assembly or device that operates to slide the air deflectors 42 between the retracted and deployed positions 166, 170. It is further contemplated that the air deflectors 42 may also operably coupled with the register ducts 26 via gears and racks, activators, or similar other mechanical assemblies.

Referring to FIGS. 3 and 8A-8E, the duct assembly 110 includes register shutters 234 operably coupled to the register ducts 26 and demister shutters 238 operably coupled to the demister ducts 34. In various examples, one register shutter 234 may be coupled to each register duct 26 and one demister shutter 238 may be coupled to each demister duct 34. In such examples, the duct assembly 110 includes four shutters. However, it is also contemplated that more or fewer shutters may be included in the duct assembly 110 without departing from the teachings herein. The register and demister shutters 234, 238 are operable between opened and closed positions 246, 250. The register and demister shutters 234, 238 may also be operable between intermediate positions 254 disposed between the opened and closed positions 246, 250. When in the closed positions 250, the register and demister shutters 234, 238 may substantially, or entirely, cover the register and demister openings 30, 38, respectively. Accordingly, the register and demister shutters 234, 238 may prevent air 82 from entering the passenger cabin 74 via the register and demister ducts 26, 34. When in the opened position 246 and/or in the intermediate positions 254, the register and demister shutters 234, 238 may operate to direct the air 82 at varying angles from the register and demister ducts 26, 34, respectively, into the passenger cabin 74 (FIG. 1).

The register and demister shutters 234, 238 may be rotatably coupled to the register and demister ducts 26, 34. As illustrated in FIGS. 8A-8E, the register shutters 234 may be rotatably coupled to the bottom surfaces 162 of the register ducts 26 adjacent to the register openings 30. The register shutters 234 may be rotated to the intermediate and/or opened positions 254, 246. Additionally or alternatively, the demister shutters 238 may be rotatably coupled to lower surfaces 258 of the demister ducts 34 adjacent to the demister openings 38. It is also contemplated that the register and demister shutters 234, 238 may be rotatably coupled to top or side surfaces of the register and demister ducts 34, respectively, via rotation assemblies 262 and rotate to the opened position 246. Stated differently, the register and demister shutters 234, 238 may be rotated via the register rotation assembly 262 and the demister rotation assembly 262, respectively. The rotation assemblies 262 may be disposed below the register and demister openings 30, 38 to minimize the interference of the rotation assemblies 262 with the airflow. In some examples, the rotation assemblies 262 for the register and demister shutters 234, 238 may be the same, or may be different rotation assemblies 262. As illustrated, the rotation assemblies 262 rotate the register and demister shutters 234, 238 downwards relative to the dashboard 14. However, different configurations of the rotation assemblies 262 and the register and demister shutters 234, 238 are contemplated, such that the register and demister shutters 234, 238 may rotate upwards or sideways without departing from the teachings herein.

As illustrated in FIGS. 8A-8E, the register shutters 234 may each have first and second sidewalls 266, 270 with an outer wall 274 disposed therebetween. While FIGS. 8A-8E illustrate the register shutters 234, it is contemplated the demister shutters 238 have similar configurations and operations. The first and second sidewalls 266, 270 may define an obtuse angle therebetween. Further, the first and second sidewalls 266, 270 may extend at similar angles outward from the rotation assembly 262. Additionally or alternatively, the outer wall 274 may be arced between the first and second sidewalls 266, 270. In various examples, the arced outer wall 274 may be convexed outward relative to the first and second sidewalls 266, 270, but may also be concaved inwards in other examples.

Referring to FIGS. 1, 3, and 8A-8E, it is contemplated that the first and second sidewalls 266, 270 and/or the outer wall 274 of the demister and/or register shutters 234, 238 may include an indicia 278 for increasing aesthetics of the duct assembly 110 and/or the passenger cabin 74 of the vehicle 10. The indicia 278 may be any pattern, image, wording, etc. and may be adjustable by the user. The first and second sidewalls 266, 270 are illustrated in FIGS. 8A-8E as having generally planar surfaces. However, the shape of the first and second sidewalls 266, 270 may differ based on a selected airflow pattern and/or configuration. Further, the overall shape of the register and demister shutters 234, 238 (e.g., the first and second sidewalls 266, 270 and/or the outer wall 274) may differ based on the selected airflow pattern and/or configuration.

With respect to the register shutters 234, as illustrated in FIGS. 8A-8E, in operation, when the register shutters 234 are in the closed position 246, the first sidewall 266 may be disposed adjacent to and/or cover the register openings 30. Accordingly, the first sidewall 266 may substantially prevent air 82 from being directed into the passenger cabin 74 from the register ducts 26. As the register shutter 234 is rotated, the register duct 26 opens to one of the intermediate positions 254. The air 82 from the register duct 26 may be directed from the register duct 26 at an angle between the register duct 26 and the register shutter 234. Accordingly, an opening angle Θ between the register duct 26 and the register shutter 234 may determine the direction of the airflow from the register duct 26. Additionally or alternatively, a surface shape of the first sidewall 266 may also determine the direction of the airflow from the register ducts 26. The opening angle Θ between the register duct 26 and the register shutter 234 may be any opening angle Θ depending on the selected airflow angle. The register shutter 234 may be rotated to the opened position 246, where the opening angle Θ between the register duct 26 and the register shutter 234 may be a larger opening angle Θ relative to the intermediate positions 254. In the opened position 246, both the first and second sidewalls 266, 270 of the register shutters 234 may be spaced-apart from the register duct 26. Alternatively, the second sidewall 270 may abut and/or be disposed adjacent to the bottom surface 162 of the register duct 26 when the register shutter 234 is disposed in the opened position 246. The demister shutters 238 are contemplated to rotate between the opened and closed positions 246, 250 in a similar manner. Further, it is contemplated that the register and demister shutters 234, 238 may otherwise be moved relative to the register ducts 26 (e.g., up-and-down, side-to-side, etc.) to move between the opened and closed position 246.

Referring to FIGS. 3, 7, and 8A-8E, in various examples, the rotation assemblies 262 may be operably coupled to the controller 214. Stated differently, the register rotation assemblies 262A for the register shutters 234 and the demister rotation assemblies 262B for the demister shutters 238 may be operably coupled to the controller 214. A signal from the controller 214 may operate to activate and deactivate the rotation assemblies 262. Each rotation assembly 262 may include a drive gear 290 configured to rotate a pivot gear 294. The drive gear 290 may be operably coupled to a motor. The drive gear 290 may engage the pivot gear 294, and the pivot gear 294 may be operably coupled to one of the register or demister shutters 234, 238. The controller 214 may be configured to rotate the drive gear 290 via the motor or similar device. Rotation of the drive gear 290 causes rotation of the pivot gear 294, resulting in the movement of the register and demister shutters 234, 238, respectively. It is also contemplated that the rotation assembly 262 may include multiple drive gears 290 and/or multiple pivot gears 294. Additionally or alternatively, the rotation assemblies 262 for the register and demister shutters 234, 238 may be magnetic-based, similar to the air deflectors 42, as described herein. Additionally or alternatively still, the rotation assembly 262 may include racks and pinion gears operably coupled to each of the register and demister shutters 234, 238. The pinion gear may move along the rack to move the register and demister shutters 234, 238 between opened and closed positions 246, 250. Further still, in various examples, the register and demister shutters 234, 238 may be manually rotated by a user. A rotation assembly 262 may be coupled to each side of each of the register or demister shutter 234, 238. In such an example, the rotation assemblies 262 of the same register or demister shutter 234, 238 may be operably coupled to one another to rotate each side of the register and demister shutters 234, 238, respectively, simultaneously. Alternatively, each of the register and demister shutters 234, 238 may include one rotation assembly 262. Additional rotation assemblies 262 are contemplated for moving the register and demister shutters 234, 238 between the opened and closed positions 246, 250 without departing from the teachings herein.

Referring still to FIGS. 3-8E the register and demister shutters 234, 238 may be operable independently of one another. For example, in embodiments including two register ducts 26 and two demister ducts 34, the four corresponding shutters (e.g., the two register shutters 234 and the two demister shutters 238) may each operate independently of one another. Stated differently, the register shutters 234 and the demister shutters 238 are independently operable between opened positions 246 and closed positions 250, respectively. Alternatively, some or all of the register and demister shutters 234, 238 may operate simultaneously and/or in conjunction with one another. Further, the register and demister shutters 234, 238 may operate independently of the air deflectors 42 disposed within the register ducts 26. In various examples, the air deflectors 42 may be in the retracted or deployed positions 166, 170 and the register shutters 234 may be in at least one of the opened, closed, or intermediate positions 246, 250, 254. Accordingly, the first and second side airflows 194, 198 may be directed at various angles into the passenger cabin 74 by the register shutters 234. Further, the center airflow 212 may be directed at various angles into the passenger cabin 74 by the register shutters 234. Additionally or alternatively, the air deflectors 42 in one of the register ducts 26 and the air deflectors 42 in the other register within the dashboard 14 may be operated independently. For example, the air deflectors 42 in one of the register ducts 26 may be in the retracted position 166, while the air deflectors 42 in the other register duct 26 may be in the deployed position 170. The air deflectors 42, the register shutters 234, and the demister shutters 238 may cooperate to provide a variety of airflows and airflow configurations within the passenger cabin 74 of the vehicle 10.

Referring to FIGS. 1-8E, the controller 214 may be operably coupled to various components of the duct assembly 110. The controller 214 may include a processor 300 such as a microprocessor, memory 304, and other control circuitry. Stored in the memory 304 and executable by the processor 300 are programmed instructions 308 configured as control routines to perform various functions. The controller 214 may be a shared central controller 214 for the vehicle 10 (e.g., a vehicle and/or body control module), or may be a separate dedicated controller 214. The controller 214 may be configured to control the HVAC system 78 to control the conditioned air 82 provided to the passenger cabin 74 via the register and demister ducts 26, 34. The controller 214 may be operably coupled to the deploying assembly 218 and the rotation assemblies 262 for controlling the air deflectors 42, the register shutters 234, and the demister shutters 238, respectively. The controller 214 may also monitor the positioning of each of the air deflectors 42, register shutters 234, and demister shutters 238. Accordingly, the controller 214 may monitor the positioning of the air deflectors 42 along the track 138 defined by the register ducts 26. The controller 214 may be operably coupled to deflector sensors 312, where the deflector sensors 312 send a signal to the controller 214 indicative of the positioning of the air deflectors 42. Additionally or alternatively, the controller 214 may monitor the positioning of the register and demister shutters 234, 238 relative to the register and demister ducts 26, 34 (e.g., the opening angle Θ therebetween). The controller 214 may be operably coupled to shutter sensors 316, where the shutter sensors 316 send a signal to the controller 214 indicative of the positioning of the register and/or demister shutters 234, 238. The deflector and shutter sensors 312, 316 may be any type of sensor. In a specific example, the deflector and shutter sensors 312, 316 may be magnetic pickups that sense a charge in magnetic field. The controller 214 may also be operably coupled to a human-machine interface (HMI) 320 having a display screen 54.

The HMI 320 may be disposed on the dashboard 14 between the driver seating area 66 and the front passenger seating area 70. Further, the HMI 320 may be disposed between the register openings 30 of the register ducts 26. The HMI 320 may be configured as a user input touch panel and/or include buttons, dials, or switches for a user to make input selections. The user may select options for the HVAC system 78 via the display screen 54 of the HMI 320. For example, the user may activate the HVAC system 78 to dispense conditioned air 82 into the passenger cabin 74. Further, the user may control the position of the air deflectors 42. In this way, the user may select whether the register ducts 26 direct the first and second side airflows 194, 198 and/or the center airflow 212 into the passenger cabin 74. The user may also select the position of the register and demister shutters 234, 238 via the display screen 54. The opening angle Θ of each of the demister and register shutters 234, 238 may be selected.

Use of the present disclosure may provide for a variety of advantages. For example, the duct assembly 110 may provide for a lower pressure drop resulting from reduced interference with the airflow. Additionally, the air deflectors 42 may provide for the first and second side airflows 194, 198, as well as the center airflow 212. Further, the demister and register shutters 234, 238 provide for a variety of opening angles Θ to direct air 82 into the passenger cabin 74 from the demister and register ducts 26, respectively at varying angles. Moreover, the duct assembly 110 discussed herein may provide for a more compact duct assembly 110, which may provide a more spacious instrument panel (e.g., dashboard 14) for additional components, electronics, and/or equipment. The dashboard 14 may also provide for improved aesthetics for the passenger cabin 74 of the vehicle 10. Additional benefits or advantages of using this device may also be realized and/or achieved.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

According to various examples, a vehicle dashboard includes a trim panel defining an airflow opening. At least one register duct defines a register opening. The at least one register duct is disposed adjacent to the trim panel and the register opening aligns with the airflow opening. At least one demister duct defines a demister opening. The at least one demister duct is disposed adjacent to the trim panel and the demister opening aligns with the airflow opening. A first air deflector is slidably engaged with the at least one register duct. A second air deflector is slidably engaged with the at least one register duct. Embodiments of the present disclosure may include one or a combination of the following features:

- at least one register duct includes a first register duct and a second register duct;
- each of first and second register ducts include a first air deflector and a second air deflector;
- at least one demister duct includes a first demister duct and a second demister duct;
- first and second air deflectors are operable between a retracted position and a deployed position;
- first and second air deflectors define first and second side airflows when in a retracted position and a center airflow when in a deployed position;
- a first air deflector includes a first biasing member and a second air deflector includes a second biasing member;
- first and second air deflectors are biased to a retracted position; and
- a register shutter is operably coupled to an at least one register duct, a demister shutter is operably coupled to an at least one demister duct.

According to various examples, a duct assembly for a vehicle HVAC system includes a trim panel defining an airflow opening. At least one register duct is disposed adjacent to the trim panel. The at least one register duct defines a register opening aligned with the airflow opening.

At least one demister duct is disposed adjacent to the trim panel. The at least one demister duct defines a demister opening aligned with the airflow opening. At least one register shutter is operably coupled to the register duct. The at least one register shutter is operable between an opened position and a closed position. At least one demister shutter is operably coupled to the demister duct. The at least one demister shutter is operable between an opened position and a closed position. Embodiments of the present disclosure may include one or a combination of the following features:
- at least one demister duct includes a first demister duct and a second demister duct, and the at least one demister shutter includes a first demister shutter and a second demister shutter;
- at least one register duct includes a first register duct and a second register duct, and at least one register shutter includes a first register shutter and a second register shutter;
- a controller is operably coupled to the at least one register shutter and at least one demister shutter; and
- at least one air deflector is disposed within at least one register duct.

According to various examples, a duct assembly for a vehicle HVAC system includes a trim panel defining an elongated airflow opening. The elongated airflow opening extends between a first end and a second end of the trim panel. A register duct is disposed adjacent to the trim panel and defines a register opening. The register opening is disposed adjacent to the elongated airflow opening. A demister duct is disposed adjacent to the trim panel and defines a demister opening. The demister opening is disposed adjacent to the elongated airflow opening. Embodiments of the present disclosure may include one or a combination of the following features:
- an air deflector is slidably engaged with a register duct;
- a controller is operably coupled to an air deflector for controlling the air deflector e between a retracted position and a deployed position;
- a register shutter is operably coupled to the register duct, and a demister shutter is operably coupled to the demister duct;
- a controller is operably coupled to a register shutter and a demister shutter, and the register shutter and the demister shutter are independently operable between opened positions and closed positions, respectively; and
- a register rotation assembly is operably coupled to the register shutter, and a demister rotation assembly is operably coupled to the demister shutter.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle dashboard, comprising:
   a trim panel defining an airflow opening;
   at least one register duct defining a register opening, wherein the at least one register duct is disposed adjacent to the trim panel and the register opening aligns with the airflow opening;
   at least one demister duct defining a demister opening, wherein the at least one demister duct is disposed adjacent to the trim panel and the demister opening aligns with the airflow opening;
   a first air deflector slidably engaged with the at least one register duct;
   a second air deflector slidably engaged with the at least one register duct, wherein the first air deflector and the second air deflector extend to the register opening, and wherein the first air deflector and the second air deflector are configured to directly change a location air enters a passenger cabin by each translating between a first location within the register duct when in a retracted position and a second location within the register duct when in a deployed position;
   a first magnet coupled to the first air deflector;
   a second magnet coupled to the second air deflector; and
   an actuator operably coupled to the first air deflector and the second air deflector, wherein the actuator is configured to adjust the first air deflector and the second air deflector to the deployed position when activated, and wherein the first magnet and the second magnet are configured to adjust the first air deflector and the second air deflector to the retracted position when the actuator is deactivated.

2. The vehicle dashboard of claim 1, wherein the at least one register duct includes a first register duct and a second register duct.

3. The vehicle dashboard of claim 2, wherein each of the first and second register ducts includes the first air deflector and the second air deflector.

4. The vehicle dashboard of claim 1, wherein the at least one demister duct includes a first demister duct and a second demister duct.

5. The vehicle dashboard of claim 1, wherein the first and second air deflectors are operable between the retracted position and the deployed position, and wherein an outer surface of each of the first air deflector and the second air deflector abuts a side of the at least one air register duct, respectively, when in the deployed position and an inner surface of the first air deflector abuts an inner surface of the second air deflector when in the retracted position.

6. The vehicle dashboard of claim 5, wherein the first and second air deflectors define first and second side airflows when in the retracted position and a center airflow when in the deployed position.

7. The vehicle dashboard of claim 1, wherein the first air deflector includes the first magnet on an inner surface thereof and the second air deflector includes the second magnet on an inner surface thereof.

8. The vehicle dashboard of claim 7, wherein the first and second magnets are configured to bias the first and second air deflectors toward the retracted position.

9. The vehicle dashboard of claim 1, further comprising:
   a register shutter operably coupled to the at least one register duct; and
   a demister shutter operably coupled to the at least one demister duct.

10. A duct assembly for a vehicle HVAC system, comprising:
    a trim panel defining an airflow opening;

at least one register duct disposed adjacent to the trim panel, wherein the at least one register duct defines a register opening aligned with the airflow opening;

a pair of air deflectors disposed within the at least one register duct and each having an end disposed proximate to the airflow opening, wherein the pair of air deflectors translate within the at least one air register between a deployed position and a retracted position, and wherein each of the pair of air deflectors includes a magnet on an inner surface thereof to bias the pair of air deflectors to the retracted position;

an actuator configured to adjust the pair of air deflectors to the deployed position, and wherein magnets adjust the pair of air deflectors from the deployed position to the retracted position upon deactivation of the actuator;

at least one demister duct disposed adjacent to the trim panel, wherein the at least one demister duct defines a demister opening aligned with the airflow opening adjacent to the register opening;

at least one register shutter operably coupled to the register duct, wherein the at least one register shutter is operable between an opened position and a closed position; and at least one demister shutter operably coupled to the demister duct, wherein the at least one demister shutter is operable between an opened position and a closed position.

11. The duct assembly of claim 10, wherein the at least one demister duct includes a first demister duct and a second demister duct, and wherein the at least one demister shutter includes a first demister shutter coupled to the first demister duct and a second demister shutter coupled to the second demister duct.

12. The duct assembly of claim 10, wherein the at least one register duct includes a first register duct and a second register duct, and wherein the at least one register shutter includes a first register shutter coupled to the first register duct and a second register shutter coupled to the second register duct.

13. The duct assembly of claim 10, further comprising:
a controller operably coupled to the at least one register shutter and the at least one demister shutter.

14. A duct assembly for a vehicle HVAC system, comprising:

a trim panel defining an elongated airflow opening, wherein the elongated airflow opening extends between a first end and a second end of the trim panel;

a first register duct disposed adjacent to the trim panel and defining a first register opening;

a second register duct disposed adjacent to the trim panel and defining a second register opening, wherein the first register duct and the second register duct are disposed in a side-by-side configuration with each of the first register opening and the second register opening aligned with the elongated airflow opening;

a first air deflector disposed within the register duct;

a second air deflector disposed within the register duct, wherein an inner surface of the first air deflector abuts an inner surface of the second air deflector when in a retracted position creating side airflow paths for air exiting the register duct, and wherein the inner surface of the first air deflector is spaced apart from the inner surface of the second air deflector when in a deployed position creating a central airflow path for air exiting the register duct;

a first demister duct disposed adjacent to the trim panel and the first register duct, wherein the first demister duct defines a first demister opening;

a second demister duct disposed adjacent to the trim panel and the second register duct and defines a second demister opening, wherein each of the first demister opening and the second demister opening is aligned with the elongated airflow opening;

a controller operably coupled to the first air deflector and the second air deflector for controlling movement of the first air deflector and the second air deflector between the retracted position and the deployed position;

an actuator operably coupled to the controller, wherein the actuator is configured to adjust the first air deflector and the second air deflector to the deployed position when activated; and a magnet coupled to each of the first air deflector and the second air deflector, and wherein the magnets are configured to adjust the first air deflector and the second air deflector from the deployed position to the retracted position when the actuator is deactivated.

15. The duct assembly of claim 14, further comprising:
a register shutter operably coupled to at least one of the first register duct and the second register duct; and
a demister shutter operably coupled to at least one of the first demister duct and the second demister duct.

16. The duct assembly of claim 15, wherein the controller operably is coupled to the register shutter and the demister shutter, wherein the register shutter and the demister shutter are independently operable between opened positions and closed positions, respectively.

17. The duct assembly of claim 15, further comprising:
a register rotation assembly operably coupled to the register shutter; and
a demister rotation assembly operably coupled to the demister shutter.

18. The duct assembly of claim 10, wherein a space defined between the pair of air deflectors is adjusted as the pair of air deflectors translates between the retracted position and the deployed position.

* * * * *